United States Patent
Larson et al.

(10) Patent No.: US 7,519,955 B2
(45) Date of Patent: Apr. 14, 2009

(54) APPARATUS AND METHOD FOR TRANSFERRING MULTIPLE SCAN LENGTH SIGNAL GROUPS FOR JTAG BOUNDARY SCANS

(75) Inventors: Lee A. Larson, Katy, TX (US); Henry R. Hoar, Missouri City, TX (US)

(73) Assignee: Texas Instruments Incorporated, Dallas, TX (US)

( * ) Notice: Subject to any disclaimer, the term of this patent is extended or adjusted under 35 U.S.C. 154(b) by 941 days.

(21) Appl. No.: 10/942,594

(22) Filed: Sep. 16, 2004

(65) Prior Publication Data
US 2005/0097518 A1    May 5, 2005

Related U.S. Application Data

(60) Provisional application No. 60/517,578, filed on Nov. 5, 2003.

(51) Int. Cl.
*G06F 9/45* (2006.01)

(52) U.S. Cl. ...................................... 717/124

(58) Field of Classification Search .................. 717/124
See application file for complete search history.

(56) References Cited

U.S. PATENT DOCUMENTS

| | | | |
|---|---|---|---|
| 6,687,865 B1 * | 2/2004 | Dervisoglu et al. | 714/726 |
| 2003/0233221 A1 * | 12/2003 | O'Brien et al. | 703/23 |
| 2004/0054950 A1 * | 3/2004 | Larson et al. | 714/727 |

* cited by examiner

*Primary Examiner*—John Chavis
(74) *Attorney, Agent, or Firm*—Frederick J. Telecky, Jr.; Wade J. Brady, III

(57) ABSTRACT

In a JTAG test and debug environment, the signal groups for boundary scans can have several lengths including signal groups that are longer that the shift register out. A storage unit is provided with a plurality of storage location lengths. The boundary scan signal groups are stored in a location having a suitable storage capacity. The command that transfers the boundary scan signal group includes a parameter identifying the relevant location. The scan control unit, upon receiving the command, transfers the entire boundary scan signal group as a result this command even if several transfers through the shift register out are required.

10 Claims, 3 Drawing Sheets

APPARATUS AND METHOD FOR TRANSFERRING MULTIPLE SCAN LENGTH SIGNAL GROUPS FOR JTAG BOUNDARY SCANS

This application claims priority under 35 USC §119(e)(1) of Provisional Application No. 60/517,578 filed Nov. 5, 2003.

FIELD OF THE INVENTION

This invention relates generally to the use of emulation units to perform test and debugging operations on a digital signal processor target system and, more particularly, to providing a method for optimizing JTAG (Joint Test Action Group) transactions between an emulation unit and the digital signal processor. The present invention improves the performance of the test and debug unit in boundary scans.

BACKGROUND OF THE INVENTION

In the past, debugging digital signal processors was done using a scan control unit that converts parallel information from a test and debug processing unit into a serial data stream. The number of bits to be scanned out for each operation is loaded into a scan length register before each scan. If a digital signal processor has several scan paths with different lengths, which must be scanned in order to perform an operation, then the scan length register must be loaded before each scan.

In a high performance scan control unit, the number of times the test and debug unit must load the registers in the scan controller can become a limiting factor of the performance of the testing procedure. This problem is compounded by the increasing speed of the test clock, which is the speed at which data is serialized and sent to the target processor.

There are two efficiency factors that govern the performance of a test and debug system. These factors are the inherent efficiency of the target processor itself, and the efficiency of the scan controller. The efficiency of the target processor relates to how many bits of information and control signals must be sent to the target processor to perform an operation such as a single step operation, memory access operation, or register access operation. This factor is ignored by this invention since the digital signal processor efficiency cannot be altered by the scan controller implementation.

The efficiency of the scan control unit relates to how many bits must be loaded into the scan control unit to cause it to send out the required number of bits for the digital signal processor to perform an operation with no dead time between operations.

If we assume a scan control unit has a 16-bit interface with the test and debug unit, and the test clock rate is 32 MHz, the scan control unit must be provided with a data value every 500 ns in order to run at 100% efficiency. In addition, the test and debug unit must load control information into the scan control unit to control the scans and the target processor JTAG interface, as well as access status from the scan control unit related to the scan operations. If the scan control unit access time and test and debug unit memory access times are on the order of 100 ns, then 40% of the bus bandwidth is consumed just by data transfers to the target signal processor. If the target processor is also returning information, then data transfers will be consuming 80% of the bus bandwidth. If the test and debug unit must access the scan control unit to determine if a data value can be loaded or read, the remaining 20% of the bus bandwidth is used up, leaving no time for loading control information into the scan controller, or execution of instructions by the debug unit.

These issues can be addressed in 3 ways: widen the data path between the test and debug unit and the scan control unit and memory, reduce the access time, and reduce the number of times the scan control unit must be accessed. Widening the data path requires additional pins on the scan control unit device, the debug unit and the memory, and may not always be possible. Reducing the access time of the scan control unit or memory might be possible, but is limited by the particular implementation of both. Reducing the number of accesses of the scan control unit provides a means of improving the efficiency, which can be applied in conjunction with the other two techniques.

Referring to FIG. 1, a block diagram of a test and debug system capable of advantageously using the present invention is shown. The test and debug system includes a user interface 5, a test and debug unit 10, and a target processor 15. The user interface 5 includes the apparatus that permits a user to interact with, and control the testing of, the target processing unit 15. The user interface 5 can include display apparatus, input apparatus such as a keyboard, etc. for initiating test and debug procedures and for receiving the results of these procedures. The user interface 5 is coupled to the test and debug unit 10 through interface unit 101. The interface unit 101 exchanges signals with the processing unit 102 of the test and debug unit 10. The processing unit 102 applies signals to and receives signals from the scan control unit 103. The scan control unit 103 includes a local processor 1031, and memory unit out 1032 for exchanging signals with the local processor 1031, a memory unit in 1035 for storing signals from the target processing unit 15, a shift register out 1034 and a shift register in 1033, the shift registers 1033 and 1034 transferring data in and out of the test and debug unit 10 under control of the local processor 1031. For purposes of the present invention, the processing unit 102 provides commands to the scan control unit 103 and supplies the contents of the memory unit 1032. The target processing unit 15 includes a test access port 151, a shift register 152, an instruction register 153, a data register 154, a mini-state register 155 and a data register 156. The test access port 151 is a state machine responsive to test mode select (TMS) signals from the processing unit 102 for controlling the JTAG apparatus in the target processing unit 15. The shift register 152 receives signals from the shift register out 1034 and transfers signals to the shift register in 1033. The shift register 152 applies signals to the instruction register 153 and with the data register 154 and receives signals from the mini-status register 155 and the data register 156.

Referring to FIG. 2, a portion of the contents of the memory unit out 1032, according to the prior art, is illustrated. In particular, the memory unit out 1032 includes a command parameter section 1032A. Examples of the parameters included in the command parameter section are parameters defining the number of bits to transfer, the type of scan, the data to scan, and parameters defining JTAG end states. A command from the processing unit 102 will include reference to these parameters and these parameters will be accessed and appropriate control signals applied to the test access port 151 by the local processor.

Referring to FIG. 3, the execution of a command is illustrated. Before a command can be issued, all the parameters, including scan length, must be loaded into the scan controller. When command A is issued, the command active signal is activated. The command active signal allows the go to shift state function, the send/receive function, and the go to end state to be executed by the scan control unit 103. When the command active signal is no longer active, then the parameter for command B can be loaded and a next command B can be executed.

A need has been felt for apparatus and an associated method having the feature of being able to increase the rate of transfer of information from a test and debug unit to a target processor in JTAG test procedures. It would be yet another feature of the apparatus and associated method to reduce the number of accesses of the test and debug unit with the scan control unit. It would be a more particular object of the present invention to provide a plurality of scan length registers, each register having a different bit length. It would be another particular feature of the apparatus and associated method to provide a field in a command from the test and debug unit to the scan control unit that identifies the scan length register having the signal group to be transferred to the test processing unit. It would be get another feature of the apparatus and associated method to transfer the signal group in the scan length register identified by the command to the target processor without further communication from the test and debug unit.

SUMMARY OF THE INVENTION

The aforementioned features are accomplished, according to the present invention, by providing a storage unit accessible to the scan control unit of a JTAG test and debug unit. The storage unit has a plurality of scan length storage locations that have different lengths. A command from the test and debug processing unit identifies one of the scan length storage locations registers. In identifying the scan length storage location, the local processor of the scan control unit will load the scan control unit shift register out with at least portions of the contents of the scan length storage unit until all the scan length storage unit contents have been transferred to the target processing unit. The entire contents of the scan length storage unit are transferred with only the one command from the test and debug processing unit.

Other features and advantages of present invention will be more clearly understood upon reading of the following description and the accompanying drawings and the claims.

DESCRIPTION OF THE PREFERRED EMBODIMENT

1. Detailed Description of the Figures

FIGS. 1, 2, 3, and 4 have been described with respect to the related art.

Figure 5:
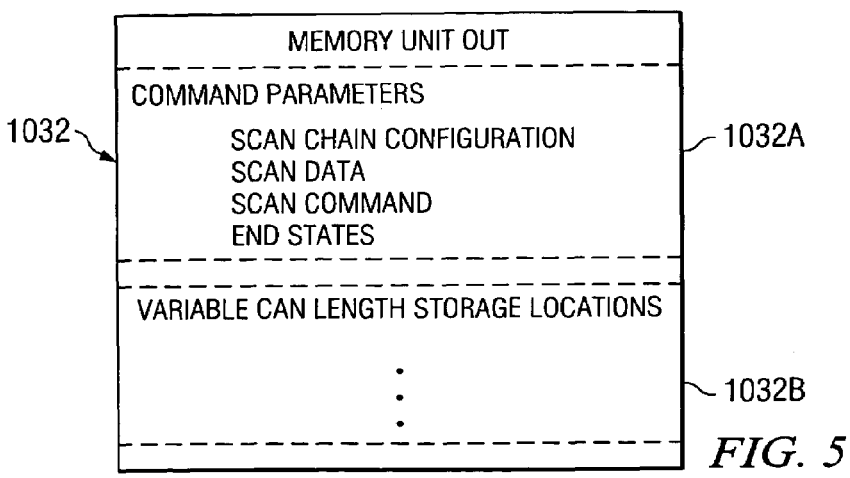
FIG. 5 illustrates the memory unit out of the scan control unit according to the present invention.

Referring next to FIG. 5, the memory unit out 1032 of the scan control unit 103 of the present invention is illustrated. The memory unit out 1032 includes a section storing the command parameters. The command parameters include the type of scan (IR or OR), the data to transfer, scan chain configuration, and the shift and end states. In addition, the memory unit out 1032 includes a section with variable scan length storage locations 1032B.

Figure 1:
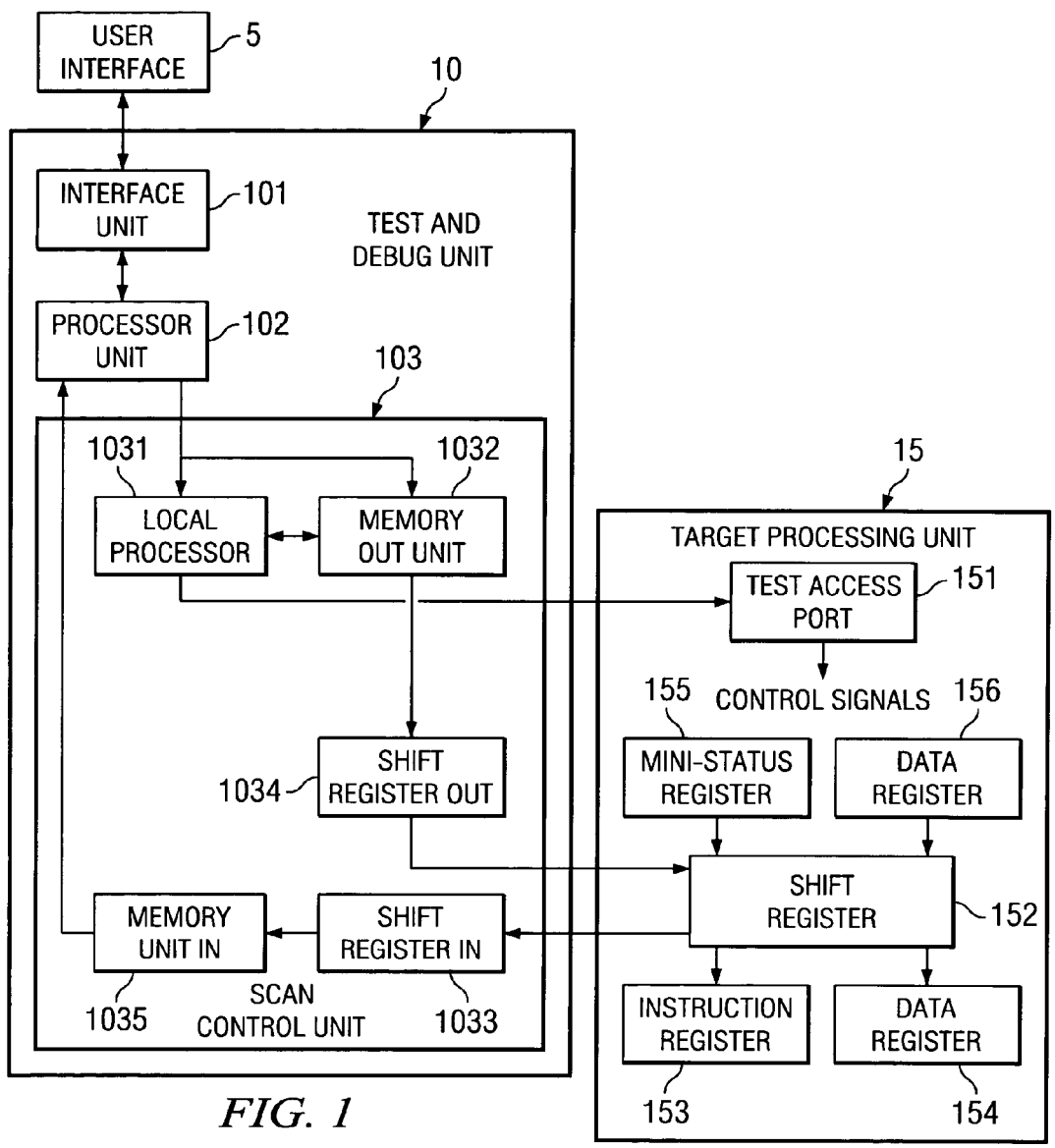
FIG. 1 is a block diagram of prior art test and debug apparatus capable of advantageously using the present invention.
Figure 2:
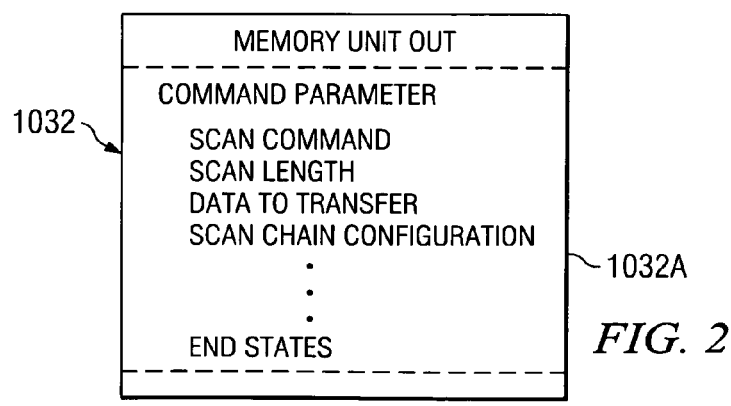
FIG. 2 illustrates the contents of the scan controller memory unit according to the prior art.
Figure 3:
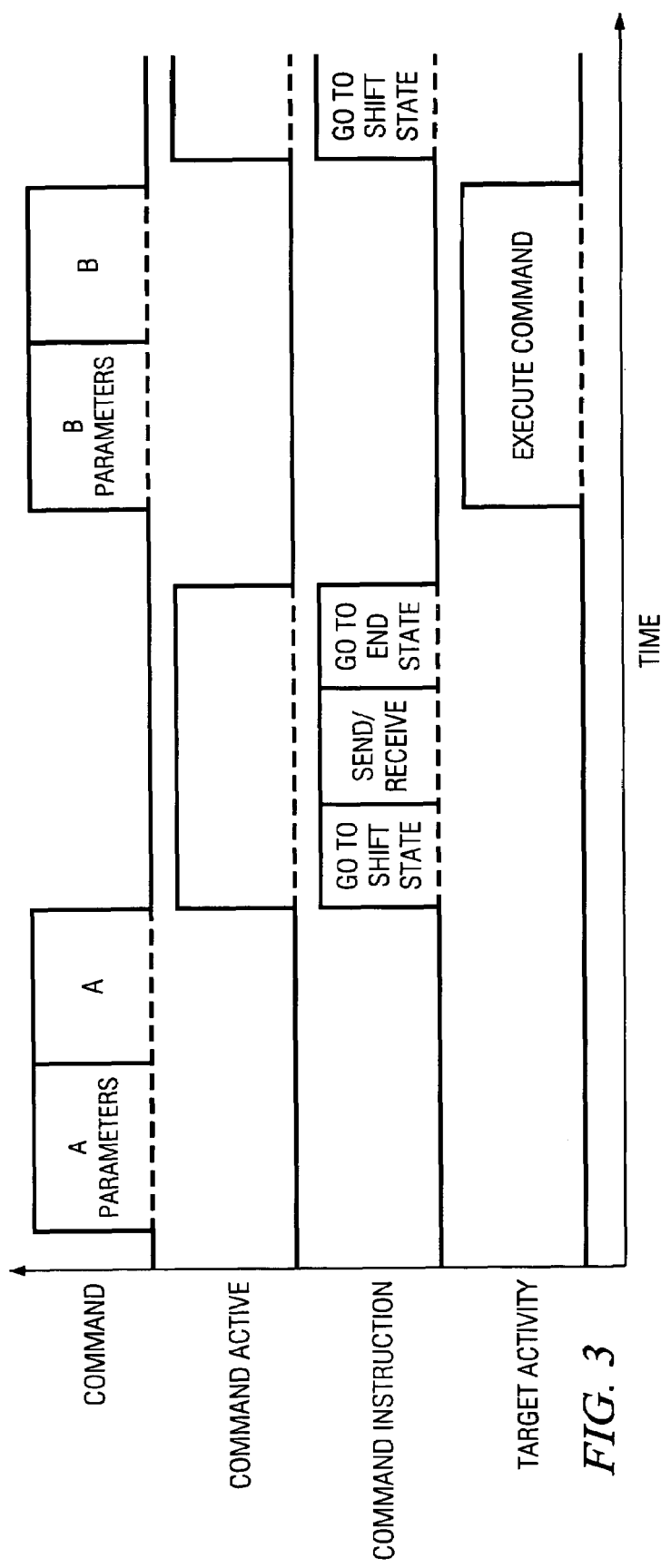
FIG. 3 illustrates the execution of a command in the JTAG test and debug environment according to the prior art.
Figure 6:
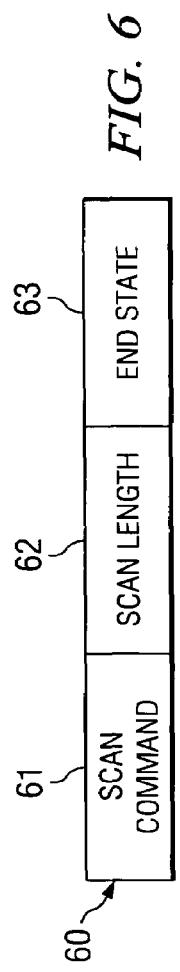
FIG. 6 illustrates the structure of a command applied to the local processor according to the present invention.
Figure 4:
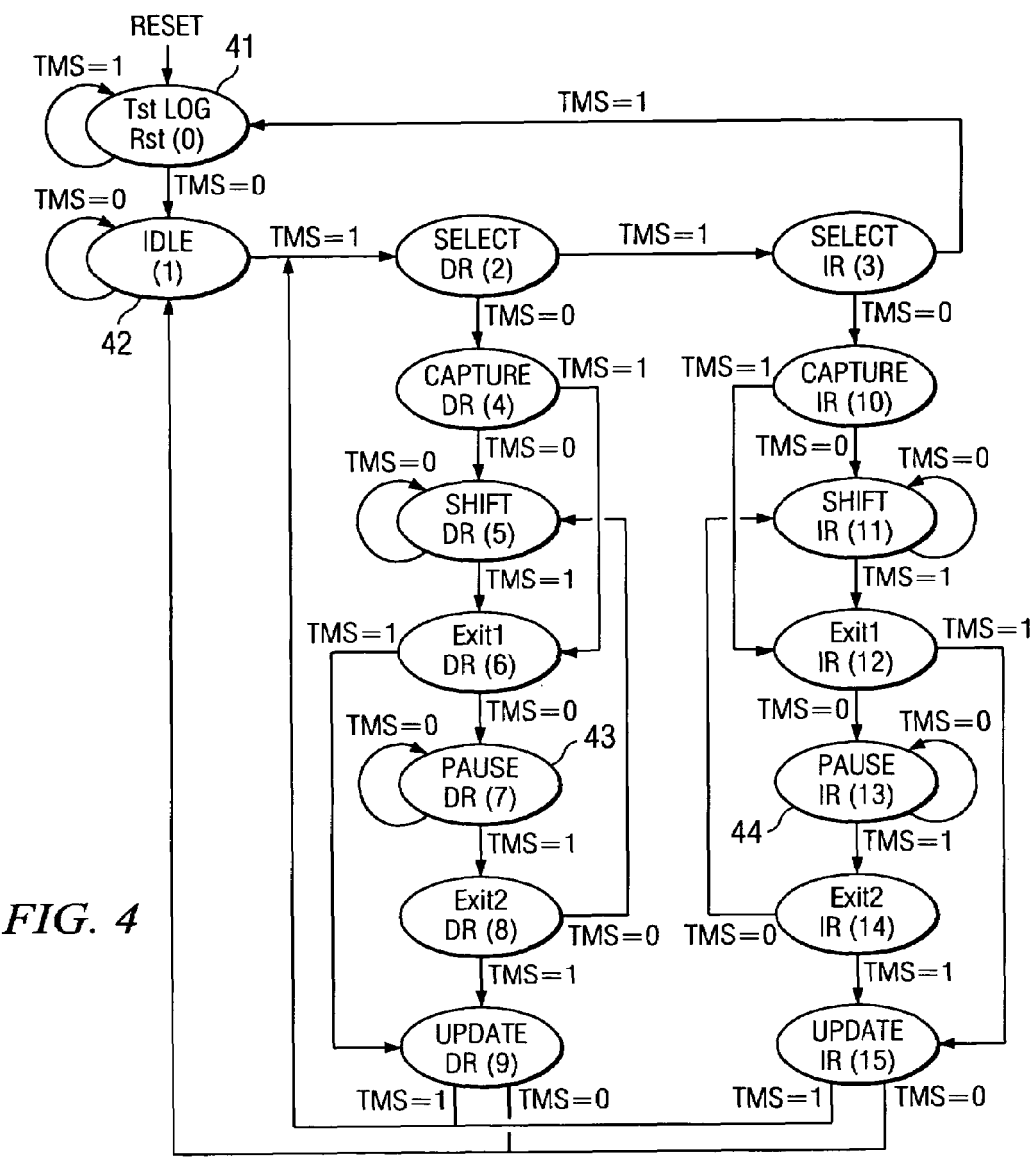
FIG. 4 is a JTAG state diagram according to the prior art.

Referring to FIG. 6, the structure of a command 60 from the test and debug processing unit to the local processor 1031 of the scan control unit is shown. The command 60 includes, for purposes of this discussion, three parameters. In the preferred embodiment, the parameters represent storage locations in the memory unit out 1032. The local processor 1031 will retrieve the fields at the indicated storage locations and implement the data transfers in an appropriate manner. The initial shift state parameter 61 and the end state parameter 63 designate storage locations that identify JTAG states illustrated in FIG. 4 and applies instructions to the test access port 151 in the target processing unit that results in the identified states. The scan length parameter 62 designates a storage location wherein is stored the signal group to be transferred to the target processing unit. In addition, the scan length parameter identifies to the scan control unit the number of time the shift register out 1034 will be required to transfer the contents of the identified variable length storage location in the group of locations 1032B in the memory out unit 1032. In this manner, the scan control unit 103 can transfer variable length signal groups to the target processing unit using a single command.

2. Operation of the Preferred Embodiment

JTAG operations, such boundary scans, can require a transfer to the target processor unit of large signal groups. The test and debug processing unit normally provides commands that transfer one signal group consistent with the size of the shift register out. In the present operation, a multi-shift register transfer is forwarded the target processor. The memory unit out associated with the scan control unit includes a storage unit with a plurality of signal group storage locations, the storage locations having differing lengths. After a command is issued by the test and debug processing unit, the scan control unit transfers the signal group at the designated locations in a series of data transfers without the necessity of additional commands.

The ability to load a lengthy signal group in a memory unit and then transfer the signal group to the target processor relieves the burden on the test and debug processing unit. The test and debug processing unit has other computational intensive responsibilities to control, such a trace or RTDX procedures. By reducing the computational burden on the test and debug unit, the performance of the test and debug unit can be improved.

As will be clear to those skilled in the art, the variable length storage locations can be registers or can be locations in a RAM memory unit.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. A test and debug system for testing a target processor, the system comprising:
   data transfer apparatus in the target processor for receiving data and for transferring data;
   a test access port in the target processor responsive to control signals, the control signals determining the state of the test and debug apparatus in the target processor; and
   a scan control unit, the scan control unit including:
   a processor responsive to commands for generating the control signals;

at least one register responsive to signals from the processor for exchanging data with the data transfer apparatus; and a plurality of scan length storage units, the scan length storage units capable of storing respective signal groups of various lengths.

2. The system as recited in claim 1 wherein at least one of the scan length storage units stores a signal group that is longer than can be entered in the at least one register.

3. The system as recited in claim 2 wherein, in response to a command, a signal group identified by the command is transferred to the data transfer apparatus without requirement of another command.

4. The system as recited in claim 3 wherein the signal group is a boundary scan signal group.

5. In a JTAG test and debug system, a method for transferring, under control of a scan control unit, a signal group having a length that exceeds a capacity of a shift register out, the method comprising:

storing the signal group in one of a group of storage locations that respectively have various signal group storage capacities; and in response to a command, the scan control unit transferring the signal group to a target processor in a plurality of transfers through the shift register out.

6. The method as recited in claim 5 further comprising selecting said one storage location based on a length of the signal group.

7. The method as recited in claim 6 wherein the signal group is a boundary scan signal group.

8. In a test and debug unit, a scan control unit comprising:

a local processor responsive to at least one command;

a shift register out for shifting signal groups out of the scan control unit; and a storage unit having a plurality of storage locations for storing signal groups, the respective storage locations having various numbers of signal positions;

wherein the local processor, in response to a parameter in a command, shifts the signal group stored in a storage location designated by the parameter through the shift register out.

9. The scan control unit as recited in claim 8 wherein the storage location designated by the parameter includes a number of signal positions greater than a number of signal positions in the shift register out.

10. The scan control unit as recited in claim 9 wherein the signal group is a boundary scan signal group.

* * * * *